(12) United States Patent
Baldo et al.

(10) Patent No.: US 8,978,543 B2
(45) Date of Patent: Mar. 17, 2015

(54) INFUSION UNIT FOR MAKING BEVERAGES FROM SINGLE-SERVING SACHETS AND MACHINE COMPRISING SAID UNIT

(75) Inventors: Massimo Baldo, Quinto Di Treviso (IT); Andrea Ferraro, Salgareda (IT); Giovanni Berto, Oimi de San Biagio di Callalta (IT)

(73) Assignee: Koninklijke Philips N.V., Eindhoven (NL)

( * ) Notice: Subject to any disclaimer, the term of this patent is extended or adjusted under 35 U.S.C. 154(b) by 287 days.

(21) Appl. No.: 13/320,926

(22) PCT Filed: May 21, 2010

(86) PCT No.: PCT/IB2010/052275
§ 371 (c)(1),
(2), (4) Date: Nov. 17, 2011

(87) PCT Pub. No.: WO2010/134054
PCT Pub. Date: Nov. 25, 2010

(65) Prior Publication Data
US 2012/0060698 A1   Mar. 15, 2012

(30) Foreign Application Priority Data
May 21, 2009   (IT) ................................. FI2009A0114

(51) Int. Cl.
*A47J 31/40* (2006.01)
*A47J 31/06* (2006.01)
*A47J 31/36* (2006.01)
*A47J 31/44* (2006.01)

(52) U.S. Cl.
CPC .......... *A47J 31/0668* (2013.01); *A47J 31/3676* (2013.01); *A47J 31/3685* (2013.01); *A47J 31/4467* (2013.01)
USPC .............................. 99/289 R; 99/295; 99/280

(58) Field of Classification Search
USPC ................ 99/289 R, 295, 280, 281, 282, 283
See application file for complete search history.

(56) References Cited

U.S. PATENT DOCUMENTS

| 3,260,190 | A | | 7/1966 | Levinson |
| 4,389,925 | A | * | 6/1983 | Piana .......................... 99/289 R |
| 4,794,853 | A | * | 1/1989 | Weber .............................. 99/295 |
| 6,182,554 | B1 | * | 2/2001 | Beaulieu et al. ............ 99/289 R |
| 6,955,116 | B2 | | 10/2005 | Hale |

(Continued)

FOREIGN PATENT DOCUMENTS

DE   202006002678 U1   4/2006
EP           1050258 A1   11/2000

(Continued)

*Primary Examiner* — Reginald L Alexander

(57) ABSTRACT

An infusion unit includes a support and a drawer having at least one seat for a single-serving sachet, the seat sliding relative to the support and movable between a charging position of the single-serving sachet and an infusion position. The infusion unit further includes a dispensing member for dispensing water under pressure to the single-serving sachet. A lever controls the movement of the drawer and a mechanical connection between the lever and the drawer and between the lever and the dispensing member. A stopping element locks the single-serving sachet into the infusion position after the dispensing. The seat, partly delimited by a pair of arms oscillating relative to the drawer, is interchangeable for seating capsules of various shapes or dimensions.

31 Claims, 13 Drawing Sheets

(56) References Cited

U.S. PATENT DOCUMENTS

| | | |
|---|---|---|
| 7,063,238 B2 * | 6/2006 | Hale .............................. 222/325 |
| 7,219,596 B2 * | 5/2007 | Kief, Jr. ....................... 99/289 R |
| 7,223,427 B2 * | 5/2007 | Knepler ........................ 426/231 |
| 7,569,243 B2 | 8/2009 | Yoakim et al. |
| 7,607,385 B2 * | 10/2009 | Halliday et al. ................ 99/280 |
| 7,980,169 B2 | 7/2011 | Fischer |
| 2005/0126399 A1 | 6/2005 | Bragg et al. |
| 2008/0121111 A1 | 5/2008 | Paget et al. |

FOREIGN PATENT DOCUMENTS

| | | |
|---|---|---|
| EP | 1208782 A1 | 5/2002 |
| WO | 2006016054 A1 | 2/2006 |
| WO | 2006126230 A1 | 11/2006 |
| WO | 2009069167 A1 | 6/2009 |

* cited by examiner

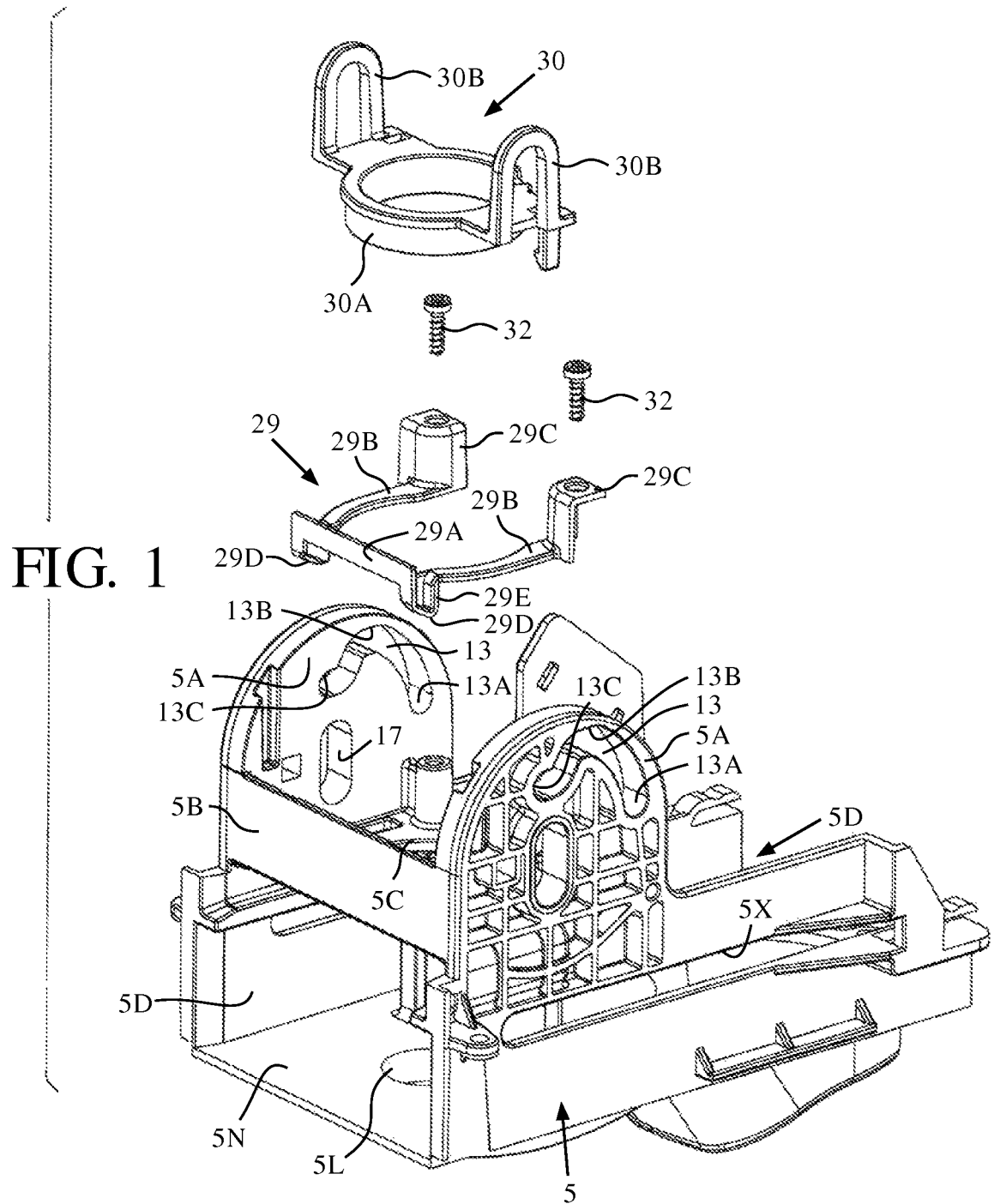

INFUSION UNIT FOR MAKING BEVERAGES FROM SINGLE-SERVING SACHETS AND MACHINE COMPRISING SAID UNIT

FIELD OF THE INVENTION

The present invention relates to improvements to infusion units for making beverages with capsules, pods or other prepackaged single-serving sachets, in particular—but not exclusively—for making coffee. The invention also relates to some machines for making beverages, such as in particular (but not exclusively) coffee, comprising infusion units of this type.

PRIOR ART

To make hot beverages, such as coffee, tea, chocolate or the like, machines are frequently utilized that employ capsules, pods or other single-serving sachets wherein there are contained the ingredients for making the beverage. The machines that utilize single-serving capsules containing ground coffee powder wherewith coffee-based beverages are made are much widespread. The single-serving capsules are inserted in an infusion unit into the machine for making the beverage. This infusion unit typically comprises a support and members for piercing, on one or both faces, the single-serving capsule, as well as members for introducing hot water under pressure that crosses the capsule and extracts the substances for making the beverage from the ingredients contained therein, or it dissolves or dilutes the ingredients contained in the capsule itself. In some embodiments, the single-serving sachets are made in the form of pods, for example made up of valves consisting of non-woven fabric sheets, wherein the coffee powder or other food product is contained. In this case, the dispensing of water under pressure occurs through the non-woven fabric, without the need for piercing. On the contrary, a zone is formed around the pod surface wherein it is possible to feed water under pressure so that it may pass through the pod.

WO 2006/016054 describes an infusion unit with two seats for receiving two single-serving capsules. These seats are located in a drawer that takes on an extracted position for allowing the user to insert the capsules into the respective seats, and a position inserted within the infusion unit, and once it has been reached, the capsules are pierced and the hot water under pressure is made to pass therethrough for obtaining the desired beverage in output from the infusion unit.

Other infusion units comprising drawers wherein single-serving capsules are inserted are described in U.S. Pat. No. 6,955,116 and in EP-A-1050258.

Another infusion unit that exhibits a sliding drawer that seats single-serving coffee sachets is described in WO-A-2006/126230.

EP-A-1208782 described a machine for making coffee by the use of single-serving capsules. This machine comprises a tray for resting the capsules, which is provided with a horizontal and vertical shifting movement controlled by a lever. The latter also controls the lowering movement of the capsule piercing unit and of water dispensing, so that with a single lever it is possible to transfer the capsule supported by the tray into the infusion chamber and close the infusion chamber by lowering the piercing and dispensing unit. Once the unit has been closed, water under pressure is introduced which passes through the capsule and extracts the flavours from the coffee powder contained therein. Once the infusion cycle has ended, the unit is opened with a reverse movement of the control lever so as to move the tray with the empty capsule out of the infusion zone to allow the user to remove the empty capsule from the tray, optionally replace it with a new capsule and repeat the infusion cycle again.

DE-U-20 2006 002 678 describes an infusion unit with a sliding drawer wherein a seat is made for inserting a single-serving sachet. The drawer is manually pushed into the infusion unit for moving the single-serving sachet into an infusion chamber. A lever closes the infusion chamber to carry out the beverage dispensing cycle.

U.S. Pat. No. 3,260,190 describes a machine for making coffee with single-serving capsules, wherein the capsules are placed inside a seat obtained in a drawer, which is then inserted in a space of the machine. Inside the space there are provided two opposite plates provided with piercing means, which are pushed against each other and tighten the coffee capsule therein between for causing the piercing. Subsequently, water is entered through the single-serving sachet for extracting the flavours from the powder contained therein.

Capsules, pods or other single-serving sachets of a various nature are available on the market. The infusion units, as well as the members associated thereto for carrying out the optional piercing of the capsules and the passage of hot water under pressure through the capsule, the pod or other single-serving sachet, are shaped for using the one or the other of the various types of capsules on the market. Some capsules are integrally sealed and must be pierced both at the top and at the bottom for allowing the passage of water and the beverage extraction. Other capsules are made so as to be pierced only at the top for allowing the inlet of hot water under pressure, whereas at the bottom they are provided with closing members that allow the beverage passage without the need of piercing.

The infusion units exhibit higher or lower automation levels according to the category of machines wherein they must be inserted. For example, there are infusion units that carry out all the operations automatically once the operator has given the start command to the infusion unit. In this case there may even be provided a store of single-serving sachets wherefrom single sachets are automatically picked, inserted into the infusion unit and optionally pierced for making the beverage, without any manual intervention by the operator. In simpler units, on the other hand, all the operations are carried out manually. The operator opens the infusion unit, manually inserts the single-serving sachet, closes the infusion unit, optionally pushing the drawer wherein he/she has arranged the capsule into the machine, and then carries out the infusion cycle.

SUMMARY OF THE INVENTION

One aspect of the present invention relates to an infusion unit particularly used with single-serving capsules that require being pierced on one face only, or with single-serving pods wherein the water under pressure is fed by approaching a dispensing member that presses against the pod surface for defining a sealed zone wherein water under pressure is introduced. According to a further aspect, the present invention relates to a manual infusion unit that allows carrying out the various operations of inserting the single-serving sachet, piercing or other operation preliminary to the feeding of water under pressure, and infusion with simple manual operations.

According to a first embodiment, the invention provides for an infusion unit for preparing a beverage with single-serving sachets, comprising in combination: a support; a drawer, exhibiting at least one seat for a single-serving sachet, sliding relative to said support and movable between a position for charging the single-serving sachet and an infusion position; a dispensing member for dispensing water under pressure to said single-serving sachet; wherein there is provided a lever for controlling the movement of said drawer and a mechanical connection between said lever and said drawer and between said lever and said dispensing member, the lever actuation causing the drawer movement from the charging position to the infusion position and the approach of the dispensing member to the single-serving sachet. Moreover, there is provided a stopping element for locking the single-serving sachet into the infusion position, preventing the movement thereof towards the charging position when said drawer is moved from the infusion position to the charging position. The seat is partly delimited by a pair of arms oscillating relative to said drawer for allowing the removal of empty single-serving sachets from said seat during the drawer movement from the infusion position to the charging position, and the dispensing member is associated to a sealing member movable towards the single-serving sachet when it is in the infusion position for pressing against the top external edge of the single-serving sachet.

In a different embodiment, the invention provides for an infusion unit for preparing a beverage with single-serving sachets, comprising in combination: a support; a drawer, exhibiting at least one seat for a single-serving sachet, sliding relative to said support and movable between a position for charging the single-serving sachet and an infusion position; a dispensing member for dispensing water under pressure to said single-serving sachet; wherein there is provided a lever for controlling the movement of said drawer and a mechanical connection between said lever and said drawer and between said lever and said dispensing member, the lever actuation causing the drawer movement from the charging position to the infusion position and the approach of the dispensing member to the single-serving sachet. Moreover, there is provided a stopping element for locking the single-serving sachet into the infusion position, preventing the movement thereof towards the charging position when said drawer is moved from the infusion position to the charging position. The seat is partly delimited by a pair of arms oscillating relative to said drawer, for allowing the removal of empty single-serving sachets from said seat during the drawer movement from the infusion position to the charging position. Moreover, the dispensing member comprises a sealing member movable towards the single-serving sachet when it is in the infusion position, under the thrust of water under pressure, for adjusting to the front surface of the single-serving sachet and seal thereon.

According to an even further embodiment, the invention relates to an infusion unit for preparing a beverage with single-serving sachets, comprising in combination: a support; a drawer, exhibiting at least one seat for a single-serving sachet, sliding relative to said support and movable between a position for charging the single-serving sachet and an infusion position; a dispensing member for dispensing water under pressure to said single-serving sachet; wherein there is provided a lever for controlling the movement of said drawer and a mechanical connection between said lever and said drawer and between said lever and said dispensing member, the lever actuation causing the drawer movement from the charging position to the infusion position and the approach of the dispensing member to the single-serving sachet. Moreover, there is provided a stopping element for locking the single-serving sachet into the infusion position, preventing the movement thereof towards the charging position when said drawer is moved from the infusion position to the charging position. The seat is delimited by a wall substantially fixed relative to said drawer and a pair of arms oscillating relative to said drawer, for allowing the removal of empty single-serving sachets from said seat during the drawer movement from the infusion position to the charging position. Moreover, the substantially fixed wall and the oscillating arms are removably applied to the drawer.

According to an even further embodiment of the invention, there is provided an infusion unit with a drawer defining an interchangeable seat for single-serving sachets cooperating with members suitable for interacting with said seat and with the machine management members, for example the mechanical, electronic and/or hydraulic members, for modifying the machine operation according to the seat configuration. The interaction members may be mechanical and interact, for example, with cam profiles, profiles or projections made on the interchangeable seat and acting on control elements of the machine. It is also possible for the interaction members to be of the electro-mechanical or electronic type, for example in the form, of microswitches.

Further advantageous features and embodiments of the invention are indicated in the annexed claims and shall be described hereunder with some exemplary embodiments.

BRIEF DESCRIPTION OF THE DRAWINGS

The invention shall be better understood by following the description and accompanying drawing, which shows a non-limiting practical embodiment of the infusion unit according to the invention. More in particular, in the drawing:

FIG. 1 shows a perspective exploded view of some components of the unit according to the invention;

DETAILED DESCRIPTION OF EMBODIMENTS OF THE INVENTION

Figure 14:
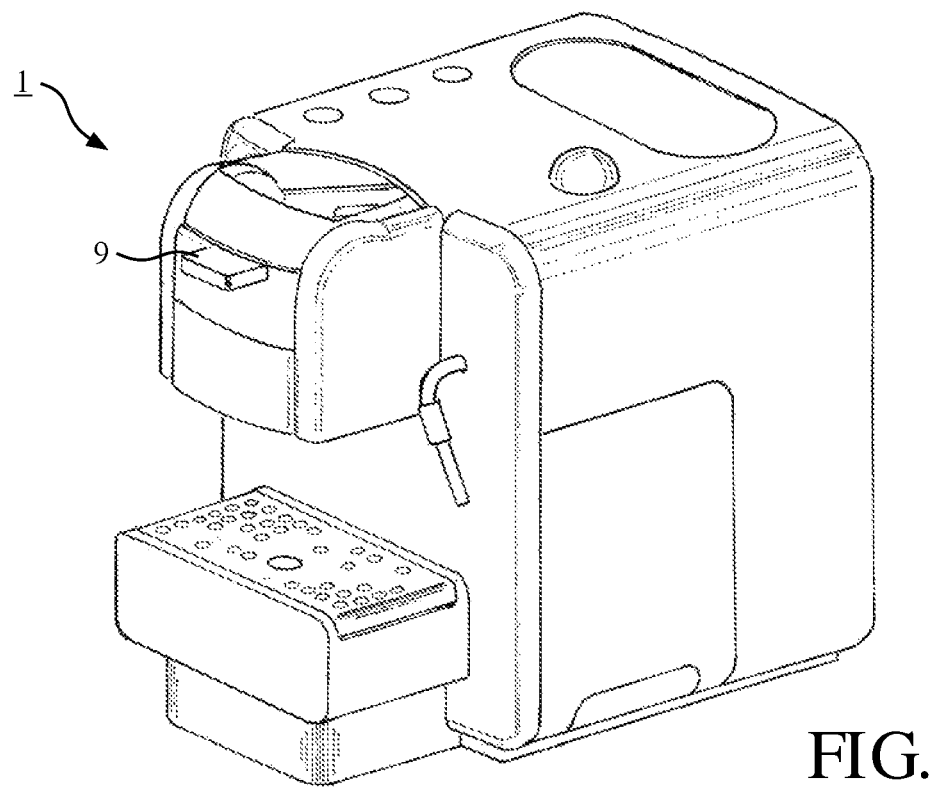
FIG. 14 shows a schematic view of a machine incorporating the infusion unit.

The infusion unit, globally indicated with reference numeral 1, comprises a support 5 with two sides 5A, connected to each other by a crosspiece 5B and by a plate 5C and may be integrated in a machine of the type schematically indicated with reference numeral 2 in FIG. 14. The machine features and structure may be of various types and shall not be described herein. Unit 1 is arranged above a support surface 4, for example consisting of a grid, whereon the cup is placed where coffee or other beverage made by the infusion unit 1 is collected.

Figure 7:
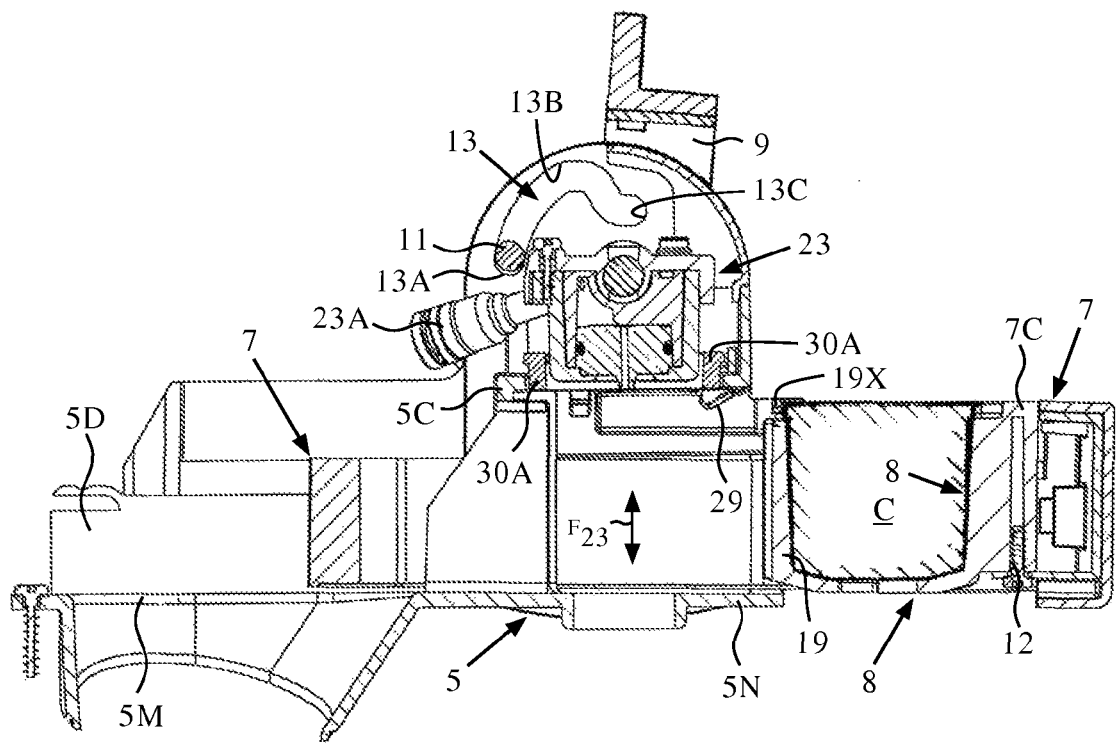
FIG. 7 shows a section according to VII-VII of FIG. 6.
Figure 8:
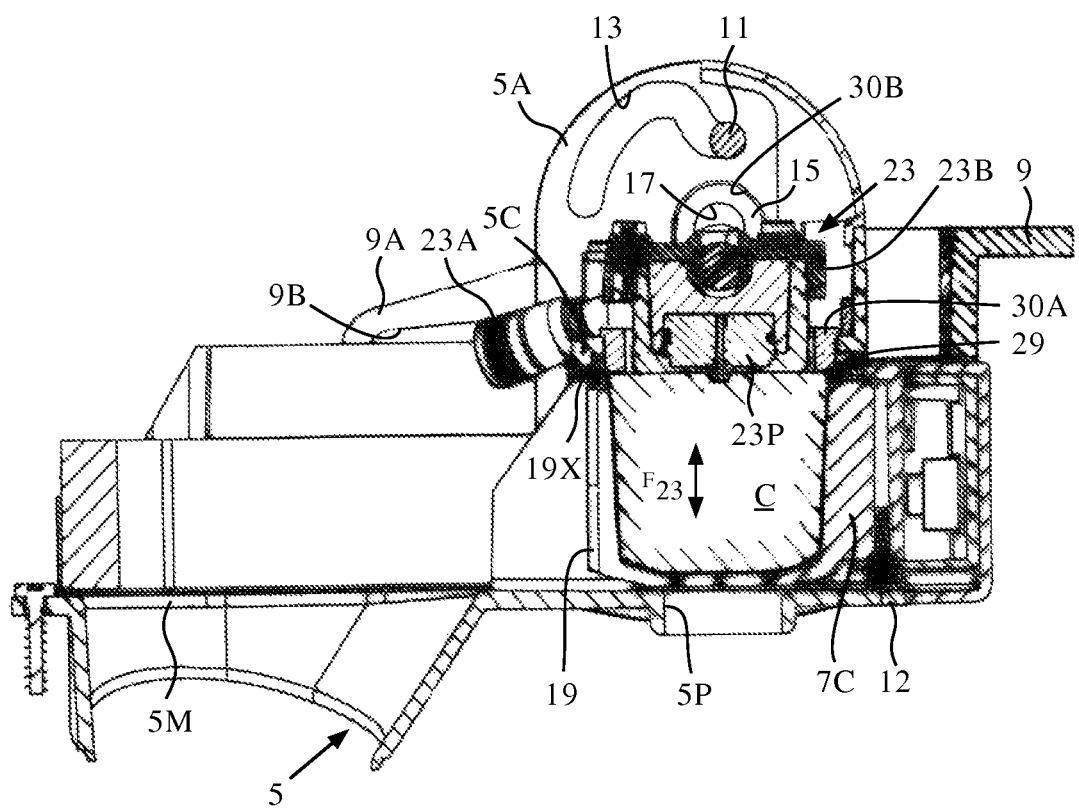
FIG. 8 shows a section similar to the section of FIG. 7, but with the single-serving sachet drawer in infusion position.
Figure 9:
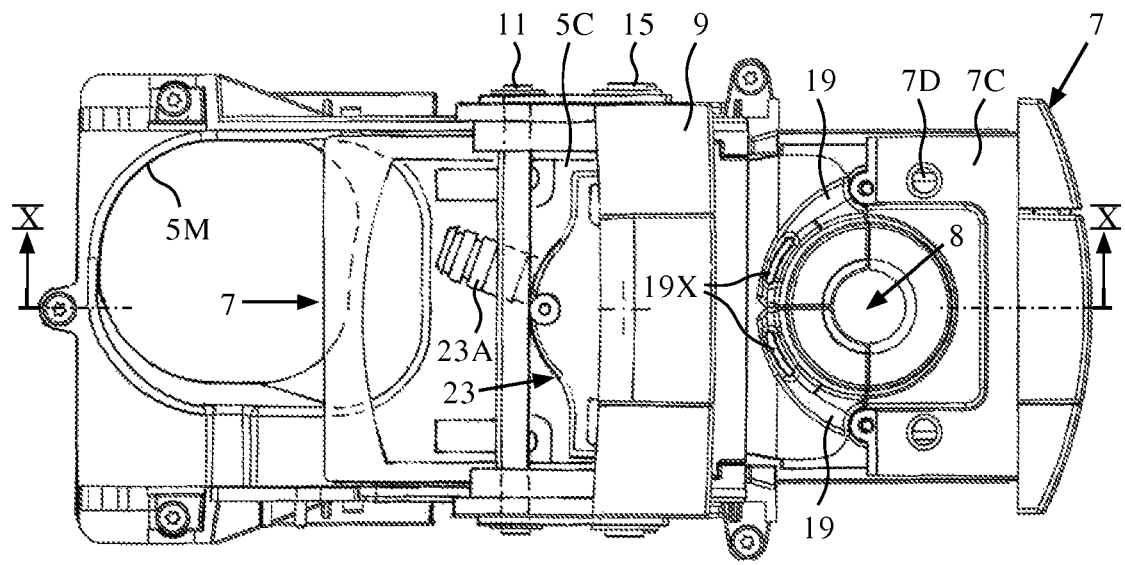
FIG. 9 shows a plan view of the infusion unit with the drawer in charging position but without the single-serving sachet inserted.

Support 5 defines a sliding guide 5D for a drawer 7, movable between a position for receiving a capsule C or other single-serving sachet (FIGS. 6, 7, 9, 10) and an infusion position (FIG. 8). Reference numeral f1 indicates the movement direction of the drawer from one to the other of the two extreme positions mentioned above.

The movement of drawer 7 according to arrow f1 is controlled by a lever 9, constrained as described below to sides 5A of support 5 and to drawer 7.

In some embodiments, lever 9 has a cross pin 11, that is, extending about orthogonally to the movement direction f1 of drawer 7. Pin 11 crosses both sides 5A passing through mirror slots 13, defining a first cam profile that contributes to defining the movement of lever 9 relative to support 5. As is seen for example in the section of FIG. 5, in an embodiment the cam profile defined by each slot 13 exhibits a first arched portion substantially as a circumference arc, extending between a first bottom end 13A and an intermediate point 13B that defines the maximum height point of the trajectory of pin 11. From point 13B, the cam profile defined by slot 13 continues with a second arched portion that extends from zone or point 13B to end 13C.

Figure 5:
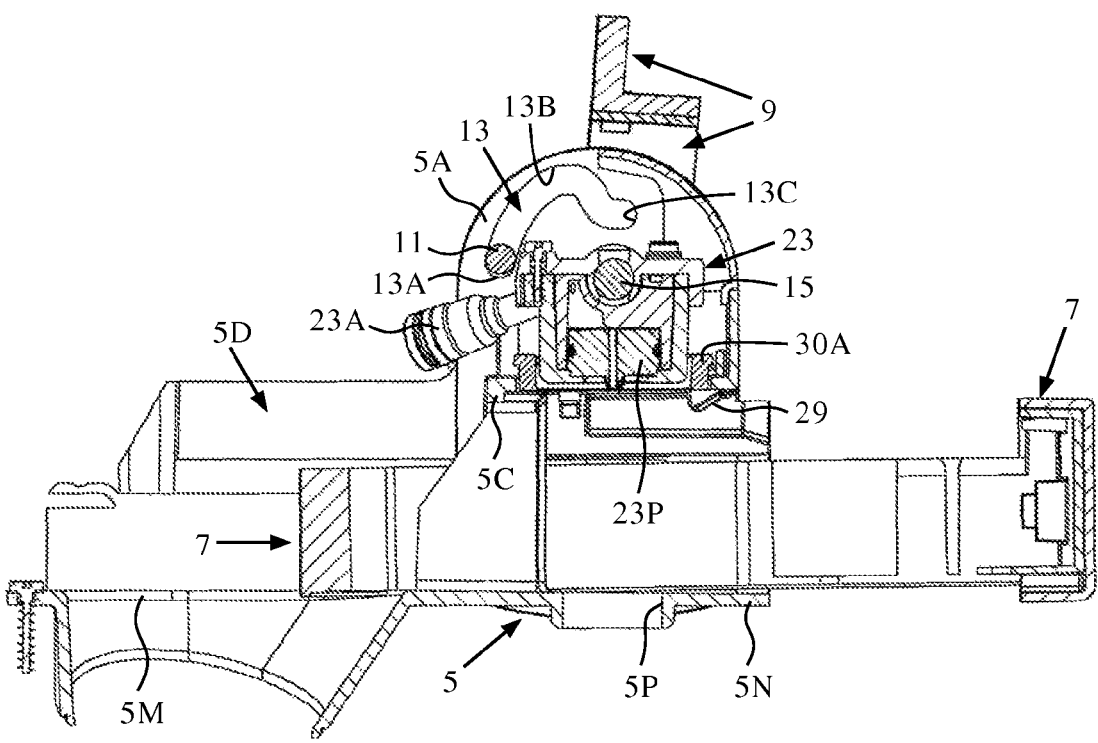
FIG. 5 shows a section according to V-V of FIG. 4.
Figure 10:
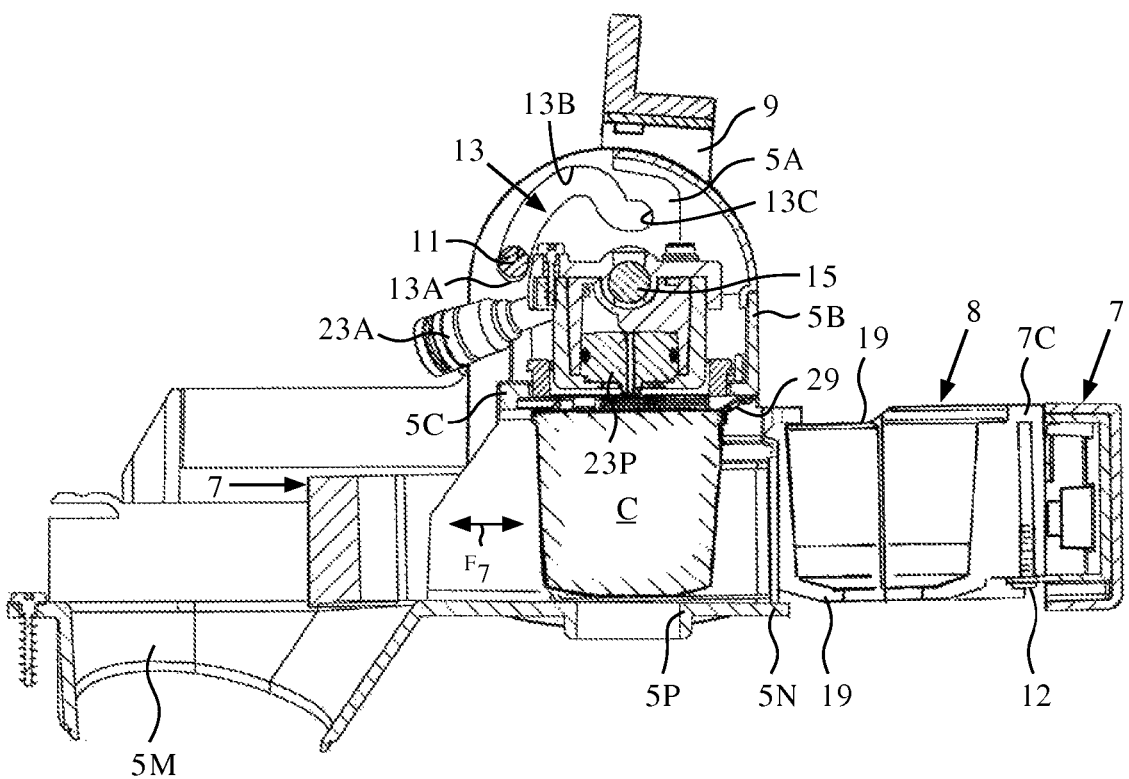
FIG. 10 shows a section according to X-X in FIG. 9.

As is seen in FIGS. 5, 7 and 10, in the open position of the infusion unit, pin 11 is at the initial end 13A of the cam profile defined by slots 13, whereas in the infusion position (FIG. 8), pin 11 is at the opposite end 13C. In the intermediate position shown in FIG. 8, pin 11 is at the zone or point 13B, which actually corresponds to the position wherein drawer 7 is in the infusion position, but wherein capsule C has not been pierced yet.

Figure 1A:
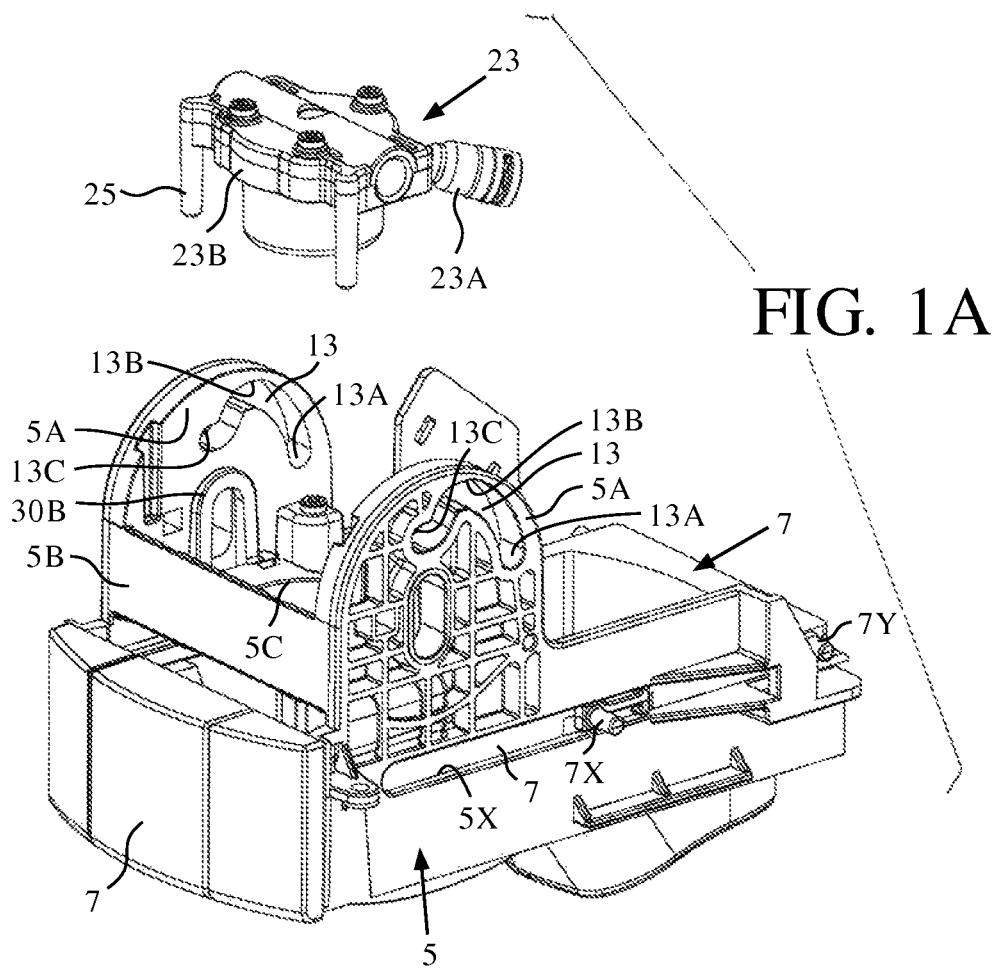
FIG. 1A shows a perspective view of the unit with removed parts and with the dispensing member of the water under pressure separated from the support of the infusion unit.
Figure 1B:
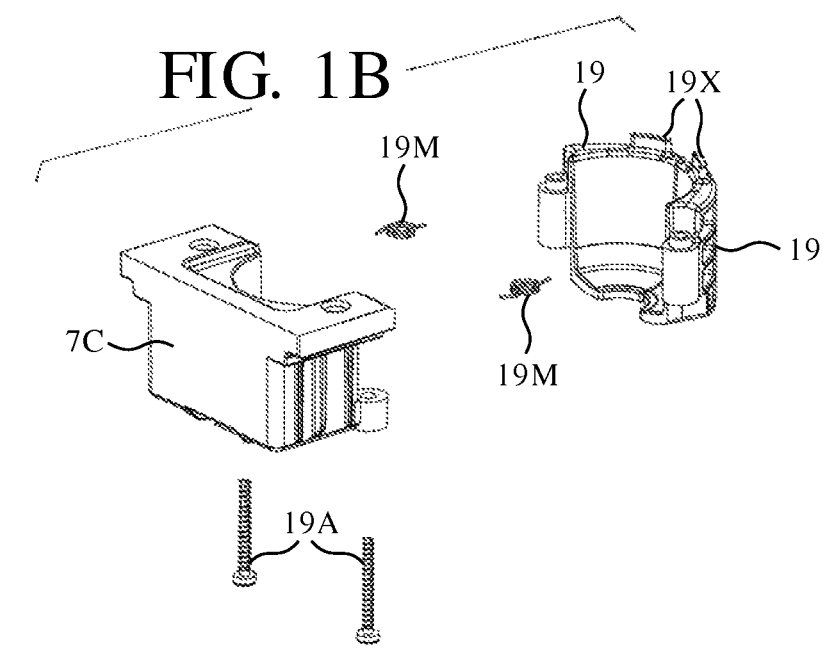
FIG. 1B shows an exploded view of components forming the seat for the single-serving sachet.

The movement of lever 9 relative to support 5 is defined, besides by the cam profile of slots 13 and by the sliding of pin 11 within such cam profile, also by the sliding of a second cross pin 15, substantially parallel to pin 11, constrained to the lever and arranged so as to slide within a guide 17 (see, in particular, FIGS. 1 and 8), substantially orthogonal to pin 15 and to the movement direction f1 of drawer 7. In the practice, therefore, the movement of lever 9 is defined by two cam profiles, one with curvilinear pattern (formed by slots 13) and the other with a rectilinear pattern, defined by guides 17. Pins 11 and 15 constitute the feelers that cooperate with these two cam profiles. Lever 9 is actuated by the operator to be moved from the position shown in FIGS. 6, 7, 9 and 10 to the position shown in FIG. 8. The cam profiles defined above impose a movement to the lever which is suitable for causing on the one side a sliding of drawer 7 and on the other side the piercing of capsule C as shall be described hereinafter.

Figure 2:
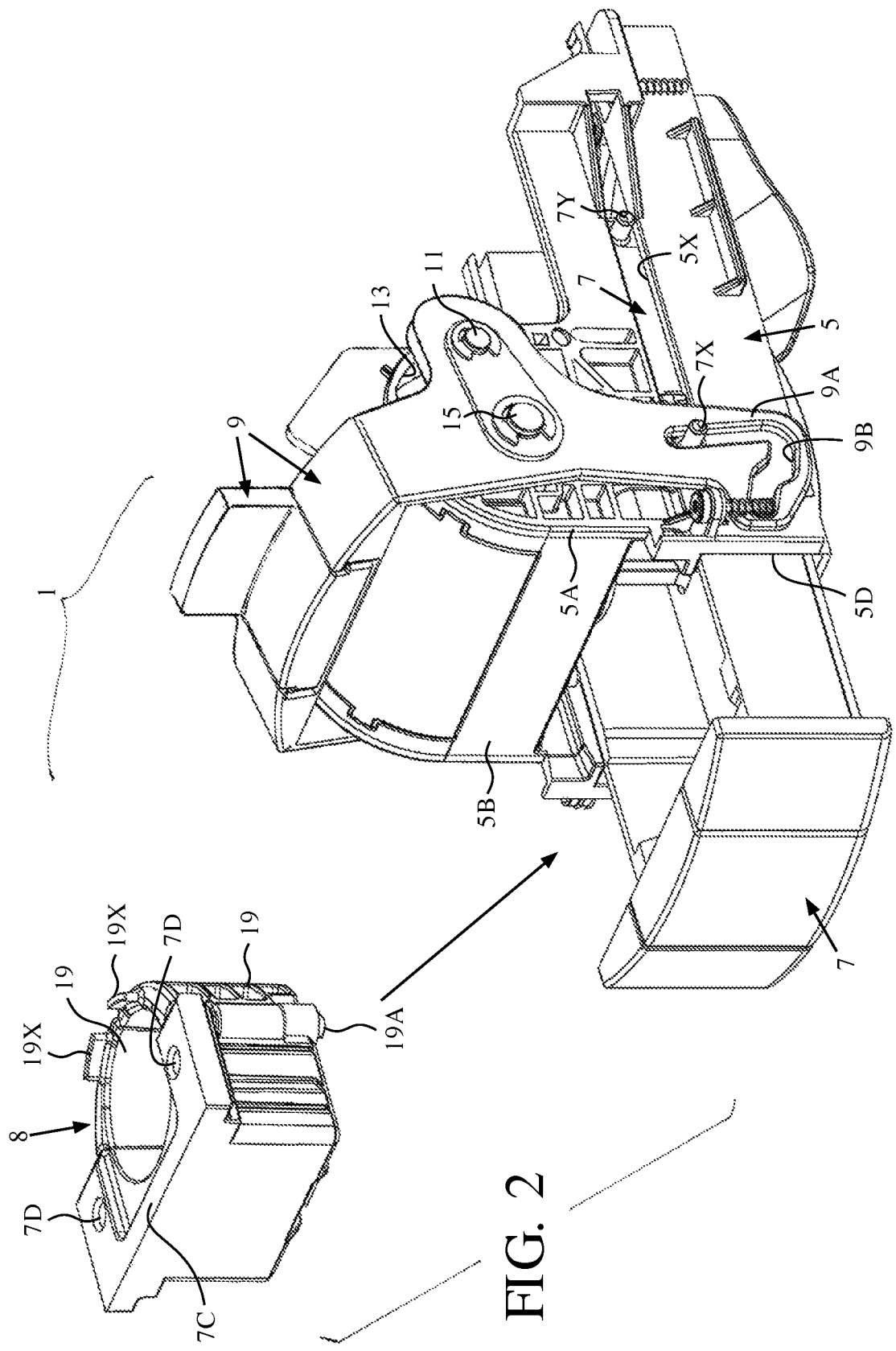
FIG. 2 shows an axonometric view of the unit according to the invention with the single-serving sachet seat removed from the drawer.
Figure 3:
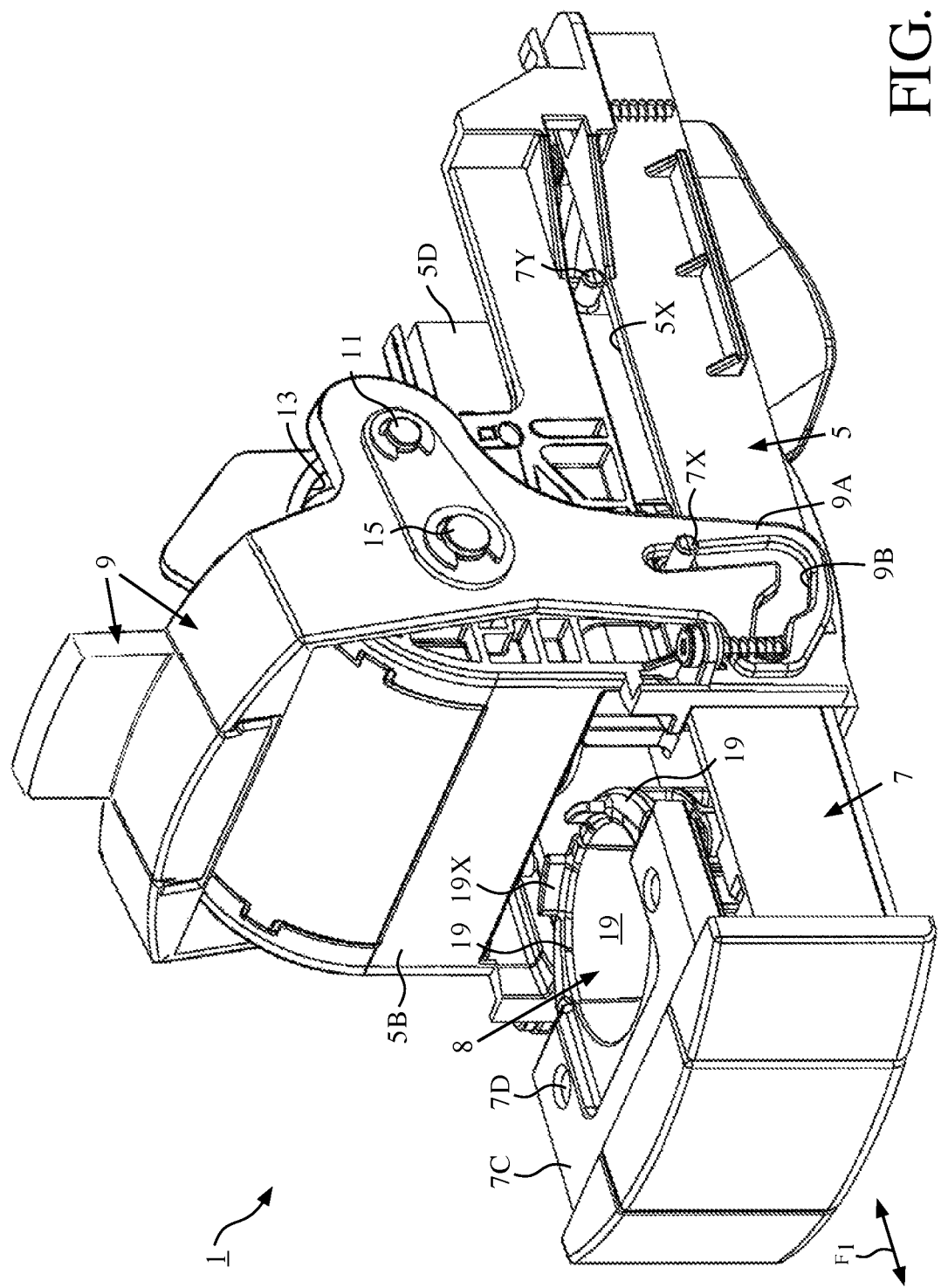
FIG. 3 shows an axonometric view of the unit according to the invention fully assembled.

Lever 9 exhibits arms or side appendices 9A, each provided, at the end thereof, which a slot 9B, wherein a respective pin 7X integral to drawer 7 engages (see in particular FIGS. 2 and 3). The latter exhibits two opposite pins 7X for engaging with the two arms 9A of lever 9. In some embodiments, slot 9B exhibits a deformed L shape, for allowing the relative movement between each arm 9A and each corresponding pin 7X of drawer 7 during the movement of lever 9 relative to support 5. Pins 7X pass through respective slots 5X substantially rectilinear, made in sides 5A of support 5.

Besides pin 7X, drawer 7 is provided on each side with a further pin 7Y, also engaging in the sliding slot 5X made in the respective side 5A of support 5.

In this way, drawer 7 is guided in the movement thereof according to direction f1 by two pairs of pins 7X, 7Y which engage and slide in slots 5X.

Drawer 7 is integral to a seat for capsules C or other single-serving sachets usable with the infusion unit 1. In the example shown, the seat is globally indicated with reference numeral 8 (see in particular FIGS. 2 and 3). It exhibits an inner surface that generally corresponds to the shape of the outer side surface of capsule C.

In some embodiments, seat 8 consists of a portion 7C integral to drawer 7, that exhibits a truncated cone surface. Portion 7C integral to drawer 7 faces the user, that is, frontally relative to the machine, and back-wise relative to the drawer insertion movement towards the infusion position.

Portion 7C integral to drawer 7 delimits the seat of capsule C along with two oscillating arms 19 hinged by screws 19A, forming articulation pins, to the fixed portion 7C of drawer 7. The oscillating arms 19 are substantially symmetrical relative to a vertical centre line plane, extending according to the movement direction f1 of drawer 7, the articulation pins 19A of the arms being substantially vertical and orthogonal to the movement direction f1 of drawer 7.

The oscillating arms 19 exhibit each an inner surface with a truncated cone portion pattern, so that in closed position such surfaces form, along with the inner surface of portion 7C, the truncated cone seat 8 with a shape complementary to the shape of capsule C or other single-serving sachet.

The oscillating arms 19 are kept in closed position by elastic members, for example spiral springs 19M (FIG. 1B) mounted about the articulation pins 19A, for forming, along with portion 7C, the substantially truncated cone seat for the single-serving capsules C.

In the position of FIGS. 6, 7, 9 and 10, the drawer is in such position that the seat formed by elements 7C and 19, 19 is accessible to the user, who can insert a new capsule C therein for making coffee or other beverage.

Figure 4:
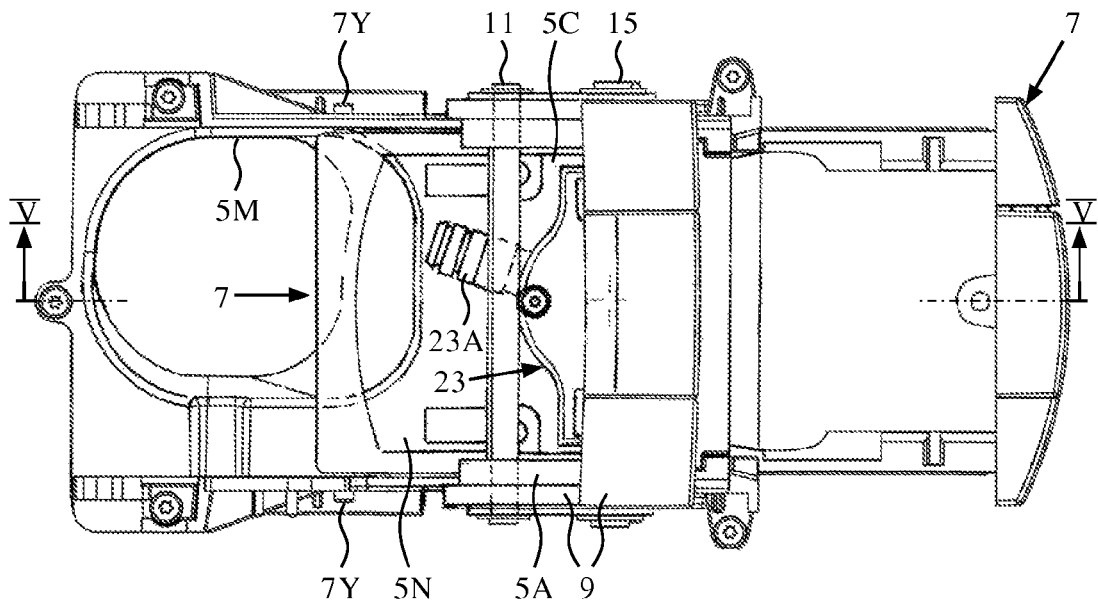
FIG. 4 shows an axonometric view of the infusion unit assembled but without the single-serving sachet seat.

As is seen in particular in FIG. 2, seat 8 formed by portion 7C integral to drawer 7 and by arms 19 hinged to portion 7C at pins 19A constitutes a removable element from drawer 7. In FIGS. 2, 4 and 5, seat 8 is removed from drawer 7, whereas in FIGS. 3, 6-11, seat 8 is suitably fixed to drawer 7. In some embodiments, the locking of seat 8 to drawer 7 is obtained by screws 12. In this way it is possible to remove seat 8 from drawer 7, for example for allowing easier cleaning thereof.

Moreover, since the shape of seat 8, defined by arms 19 and by portion 7C is complementary to the shape of capsule C or other single-serving sachet, the removability of seat 8 allows adapting a same unit 1 to the use of differently shaped capsules. It is possible, for example, to market a machine fitted or finable with different seats 8 for different capsules or single-serving sachets C. Or it is possible to produce machines already adapted to one or the other of a plurality of different capsules, using the same machine design and replacing only components 19, 19, 7C that form seat 8. This constitutes a substantial advantage for the manufacturer.

It is also possible for each seat 8 to be provided with means for interacting with a control system of the machine, allowing the modification of the machine behaviour according to the type of seat 8 each time applied to drawer 7, as shall be better illustrated hereinafter.

In the embodiment shown, the infusion unit 1 exhibits a member for dispensing water under pressure 23 consisting of or comprising a piercing member. The dispensing member 23 is constrained to pin 15 of lever 9 and is therefore provided with a shifting movement according to the dual arrow f23, obtained by the sliding of pin 15 into the guide formed by the two slots 17. The dispensing member 23 is integral to pins 25 for locking drawer 7 during the infusion step. Pins 25 are visible in particular in FIG. 1A. When the dispensing member 23 is moved downwards to the infusion position, pins 25 penetrate into holes 7D [FIG 2] made in drawer 7 and more exactly in the removable portion 7C of the same drawer. Pins 25 constitute locking members against the thrust that may be exerted thereon by the effect of the tendency of capsule C to expand during the infusion step with water under pressure.

Locking members are also provided for preventing the oscillation in opening of arms 19. These locking members may consist of pins similar to those 25 and that insert adjacent arms 19. In the embodiment shown, on the contrary, the lock of oscillating arms 19 is obtained by the interaction of a top appendix 19X each arm 19 is provided with, with an abutment formed by the cross plate 5C, as is seen in particular in FIG. 8.

The dispensing member 23 is fitted with a piercing member 23P which, when the dispensing member 23 is lowered against capsule C, pierces the top portion of the capsule. In the example shown, the piercing member 23P is permeable for allowing the dispensing of hot water under pressure through the piercing member itself. Moreover, other configurations and embodiments of the piercing member are also possible, which for example may exhibit a plurality of piercing tips, associated to one or more water inlet conduits.

The dispensing member 23 is associated to a sealing member 30 visible in particular in FIG. 1 where it is shown separately from unit 1 and before the assembly. The sealing member 30 comprises an annular body 30A and two arched appendices shaped as an upturned U, indicated with reference numeral 30B. The arched appendices extend about the two slots 17 and allow the passage of pin 15 therethrough. The annular body 30A forms the actual sealing element of the sealing member 30. Said annular body 30A is moved downwards by lever 9 up to pressing against the top surface of capsule C during the infusion. FIG. 8 shows the maximum lowering position of the sealing member 30, a position wherein the annular body 30A is pressed against the top edge or flange of capsule C.

This sealing member has the function of preventing an excessive deformation or even the accidental opening of the capsule along the top edge or flange thereof. Here, in fact, there normally is a welding line between the side wall and the top portion of capsule C. The welding line represents a weakening point that may yield during the infusion under the thrust of water under pressure that is introduced into capsule C. The annular body 30A of the sealing member 30 opposes the tendency of the top wall of the capsule to raise and detach from the side wall, preserving the capsule integrity and preventing water, steam or coffee leaks along the welding edges. The thrust on the annular body 30A of the sealing member 30 is exerted by a flange 23B of the dispensing member 23 which is in turn pushed by pin 15 of lever 9.

The operation of the infusion unit described above is as follows.

Figure 6:
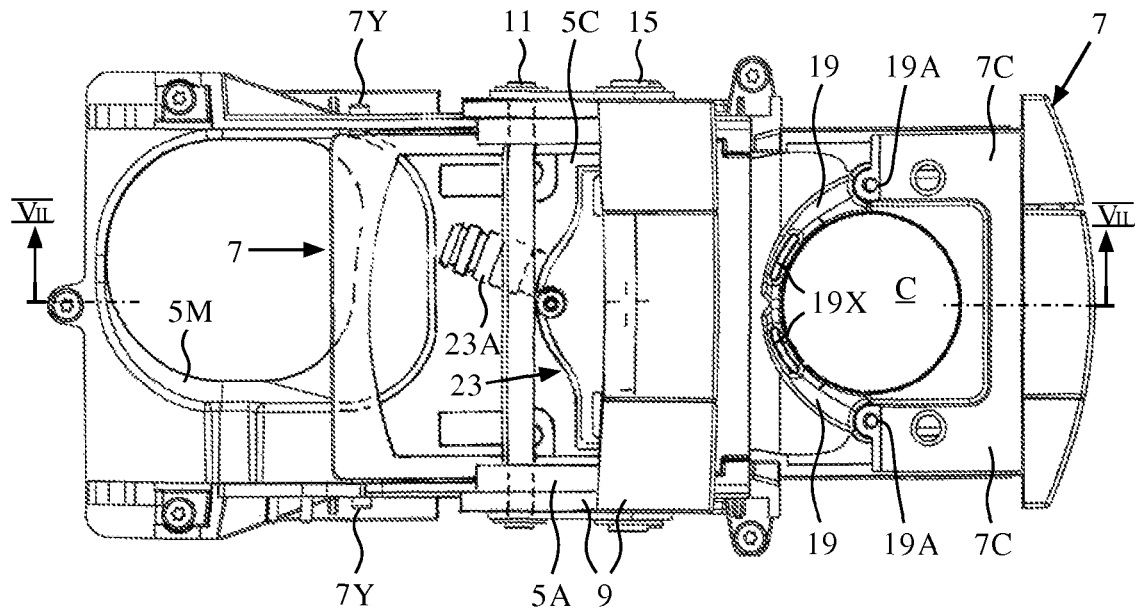
FIG. 6 shows a plan view of the unit with a single-serving sachet inserted and the drawer into position.

At first, the infusion unit is in the position of FIG. 3 and a single-serving capsule C may be inserted in seat 8. The portion of drawer 7 wherein seat 8 is obtained is arranged outside the machine seat wherein the infusion unit 1 is applied, for allowing the insertion of a new capsule C in the empty seat 8. FIGS. 6 and 7 show the open position of drawer 7 with capsule C inserted in seat 8.

In the fully open position of FIGS. 3, 6 and 7, lever 9 is in substantially vertical position, pin 11 which forms the feeler for the cam profile defined by slots 13 is in the low position at ends 13A of slot 13. The dispensing member 23 with its piercing member 23P is in the raised position, it being integral to pin 15 constrained to lever 9, which is also in the maximum raising position thereof within the guiding slots 17.

The following operations must be carried out to perform the infusion cycle:
 ejecting any empty capsules C present into the infusion unit,
 moving a new capsule inserted in seat 8 formed by components 7C, 19, 19 into infusion position,
 piercing the capsule at the top and then dispensing hot water under pressure through the capsule for preparing the beverage.

All of these operations are carried out by the simple movement of lever 9 from the position of FIGS. 3, 6, 7 to the position of FIG. 8. In this example, the empty infusion capsule used in the previous cycle is not present in the infusion position.

Due to the constraint represented by pins 11, 15 relative to the fixed support or structure 5, the movement of lever 9 is not an oscillation movement but a complex rotary-shifting movement. This allows carrying out all the movements required for obtaining the operations mentioned above.

In a first part of the movement of lever 9, pin 11 moves along the circumference arc portion between point 13A and point 13B of slots 13, whereas pin 15 remains substantially stationary. This first portion of the movement therefore is a rotation movement about the axis of pin 15 and the dispensing member 23 does not move.

In this movement, thanks to the coupling between pins 7X and slots 9B, arms 9A of lever 9 pull drawer 7 making it carry out the movement from the charging position (FIGS. 3, 6, 7) to the dispensing position (FIG. 8).

The position reached is such that seat 8 formed by portion 7C and by the oscillating arms 19, wherein a new capsule C has been inserted, is in axial alignment with the dispensing member 23, thereunder. Underneath the dispensing member 23, the fixed support 5 exhibits an opening 5P wherethrough the beverage made with capsule C comes out, which in this exemplary embodiment for its shape does not require being pierced at the bottom.

During the shifting movement of drawer 7 from the position of FIGS. 3, 6, 7 to the intermediate position (not shown) with pin 11 of lever 9 in point 13B, any empty capsule C into the infusion unit, used in the previous infusion cycle would be pushed by the front surfaces of the oscillating arms 19 for following the movement of drawer 7 up to reaching a second opening 5M obtained in the base of the fixed support 5. In this way, the empty capsule C falls below the infusion unit 1 into a collecting container, not shown.

In the position of FIGS. 6 to 10, the drawer has reached such position that the top appendices 19X of oscillating arms 19 are in abutment against plate 5C. Holes 7D of drawer 7 are aligned with pins 25 integral to the dispensing member 23.

The further lowering of lever to its final position causes movements of the various members of the infusion unit up to reaching the position of FIG. 8. This movement is still guided by slots 13 and by the guide formed by slots 17 wherein pins 11 and 15 respectively slide. Pin 15 carries out a downward shifting movement in a substantially vertical direction and pulls the dispensing member 23 therewith. The latter then penetrates through the top closing surface of capsule C reaching the position of FIG. 8, wherein the piercing member 23P of the dispensing member 23 has crossed the top surface of capsule C so as to place the water feeding conduit in fluid connection with the capsule. As is seen in the drawing, the dispensing member 23 also exhibits a conduit 23A for feeding hot water under pressure, which reaches the interior of the capsule through the permeable piercing member 23P.

The movement for lowering lever 9 to the position of FIG. 8 also causes the penetration of pins 25 into holes 7D of drawer 7 and the lowering of the annular body 30A of the sealing member 30 as well as the thrust thereof against the top flange of capsule C.

Drawer 7 and arms 19 are thus locked into the infusion position and water under pressure may be entered into the capsule. The infusion cycle is started for example after the reaching of the position of FIG. 8 has been detected by a suitably located microswitch, for example for being actuated by arms 9A of lever 9. The position is maintained up to completing the water dispensing and making of the beverage through the extraction of flavours from capsule C. The beverage exits from the bottom of capsule C which may be of the type fitted with a filtering wall, permeable to the beverage, so as to not require a piercing of the bottom. The beverage exits from hole 5P of wall 5N of the fixed structure. Hole 5P may seat a conduit that ends with a dispensing spout or with a pair of parallel dispensing spouts.

At the end of the infusion, lever 9 is lifted again from the position of FIG. 8 to the position of FIGS. 3, 6, 7, 9, 10. In this movement, drawer 7 and the dispensing member 23 return to the initial position following the lever movement. The retraction movement of drawer 7 is obtained thanks to the constraint between arms 9A and pins 7X of drawer 7. The empty capsule C1 is retained in the infusion position and then extracted from seat 7C, 19, 19 for example by providing a stopping element comprising a suitably shaped elastic sheet 29, as is seen in particular in FIG. 1. In this embodiment, the elastic sheet 29 exhibits a cross portion 29A connected by appendices 29B to ends 29C that may be fixed to support 5 by screws 32. Sheet 29 made be made of metal or plastic material sufficiently stiff and elastic to allow an oscillation movement of the cross portion 29A by the effect of the bending deformation of appendices 29B.

Preferably, between appendices 29B and the cross portion 29A, the sheet is shaped for forming two bottom projections with inclined walls 29D facing seat 8 of drawer 7. In the insertion movement of the drawer, the top edge of capsule C pushes against the inclined walls 29D causing an upward bending of the elastic sheet, so that capsule C may go beyond the bottom projections and arrange into the infusion position. The reverse movement of drawer 7 from the infusion position to the charging position makes the top flange or edge of the capsule abut against substantially vertical walls 29E of the bottom projections of the elastic sheet 29. This prevent the capsule from, moving along with drawer 7 and causes the opening of the oscillating arms 19 that rotate about pins 19A overcoming the closing force exerted by springs 19M that stress the same arms into closed position. In this way, drawer 7 is returned to the charging position whereas the capsule remains in the infusion position and arms 19 go beyond it, to then close by the effect of the elastic force once the empty capsule has been completely removed from seat 8.

As an alternative to the elastic thrusting system of the oscillating arms 19 in the closing position there may be provided a cam system obtained on the bottom wall 5N of support 5.

FIG. 10 shows the infusion unit 1 with the drawer in charging position (open drawer) and an empty capsule retained in the infusion position by the elastic sheet 29. In the next infusion cycle, the new capsule that is inserted in the drawer passes underneath the elastic sheet 29, deforming it upwards and arms 19 push the empty capsule away from the infusion position to the discharge opening 5M.

Figure 11:
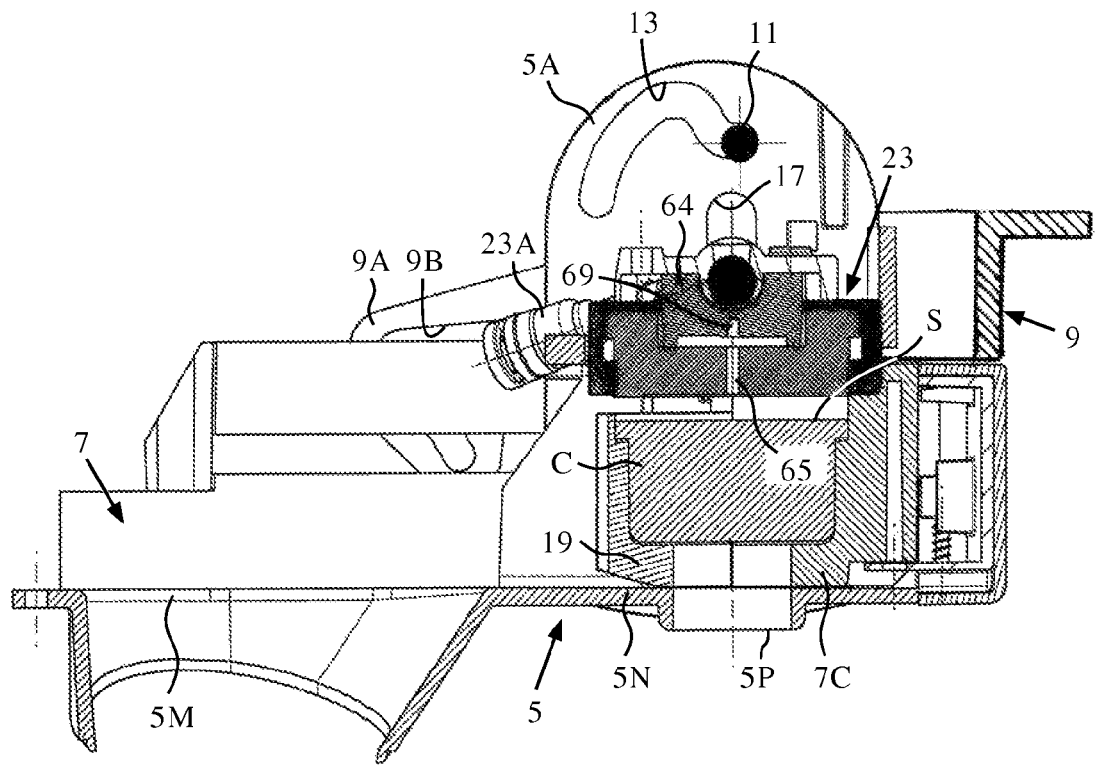
FIGS. 11 and 12 show longitudinal sections of an infusion unit according to the invention in a modified embodiment.
Figure 12:
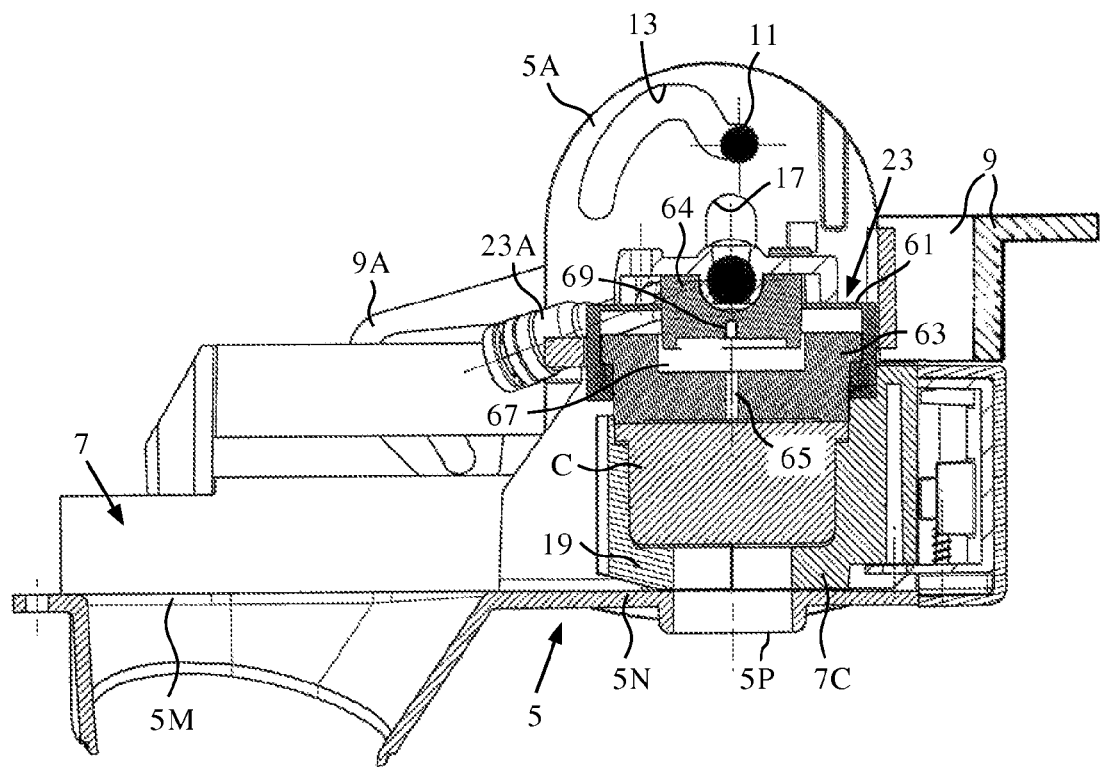

FIGS. 11 and 12 show a modified embodiment of the infusion unit according to the invention. The same reference numerals indicate the same or equivalent parts to those of the above embodiment. The variations substantially concern the dispensing member 23. In this embodiment, the dispensing member 23 comprises a chamber 61 wherein a sealing member 63 is slidingly seated, with as through hole 65 in communication with an inside volume 67 defined in a cavity of the sealing member 63. Volume 67 is in communication with the outlet of a conduit 69, wherethrough hot water under pressure coming from the dispensing tube 23A is dispensed. In the absence of hot water dispensing, the dispensing member 23 takes on the position shown in FIG. 11, with the sealing member 63 retracted within chamber 61 and thus space relative to the front surface S of the single-serving capsule C which, in FIG. 11, is in the infusion position. In FIG. 12, the unit is under pressure and the inside volume 67 defined between the sealing member 63 and a core 64 integral to chamber 61 protruding therein is filled with water under pressure which, through a passage 65, arrives above the top wall of capsule C. This may be opened by the effect of the water pressure, or it may be water permeable, for example may be made with a grid and a closing element made of paper, non woven fabric or other. In other embodiments, the sealing member 63 may be provided with a piercing member (not shown) applied to the bottom surface of the sealing member 63.

The sealing member 63 is pushed by the water pressure against the top flange of capsule C so as to obtain on the one side the sealing effect against the side leak of water, and on the other side optionally a thrust effect on the flange of capsule C, thus preventing an accidental breakage of the same flange, similar to what is obtained with the annular body 30A of the sealing member 30 shown with reference to FIGS. 1 to 10.

Thus, also with the system shown in FIGS. 11 and 12, a protection is obtained against the accidental breakage or against an excessive deformation of the top surface of the capsule and in particular of the flange thereof at the welding between the top wall and the side walls of the same capsule. At the same time, the system described allows manipulating capsules with even different shapes and/or dimensions, thanks to the adaptability of the sealing member 63.

As mentioned above, making seat 8 formed by the oscillating arms 19 and by portion 7C of the drawer so as to allow the replacement thereof it is possible to assign an additional function to the infusion unit which consists in interacting with an electronic an/or hydraulic management system of the machine wherein the infusion unit is inserted, for influencing the machine operation, the infusion parameters and others according to the type of capsules and thus to the type of seat 8 used.

Figure 13:
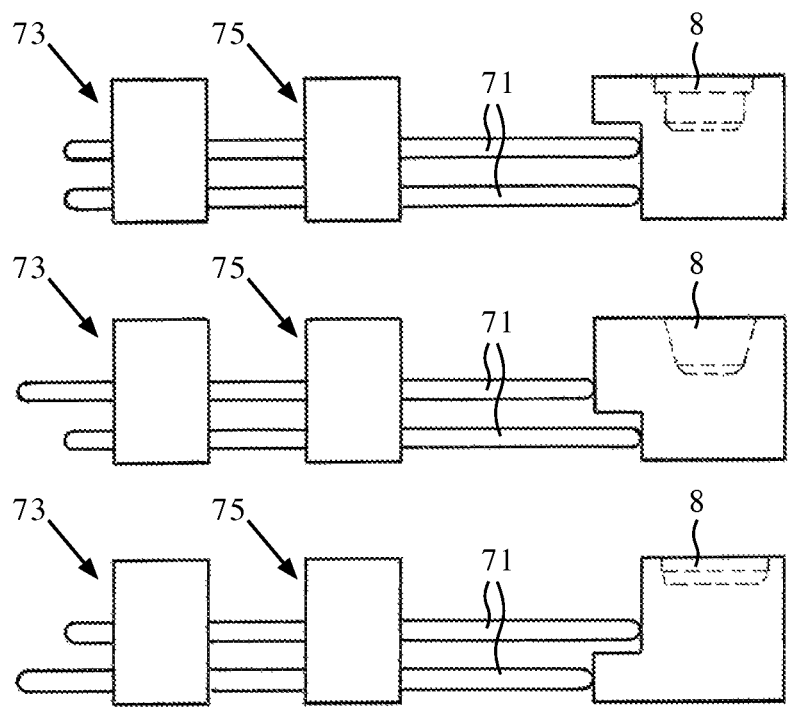
FIG. 13 shows a schematic view of an auxiliary function that may be carried out with the unit of the invention.

The way this function is obtained is schematically shown in FIG. 13. Here there schematically shown three different possible configurations of the infusion unit, which differ from each other by the shape of seat 8 of capsule C. Seat 8 is here schematically shown and in FIGS. 13A, 13B, 13C there is shown how the same seat may have a variable outer shape, especially at a zone wherein the same seat interacts with generic mechanical members 71, which for example may consist of cursors or other elements that interact with seat 8 of the capsule. These mechanical elements 71 are arranged into three alternative ways according to the outer shape of seat 8 of capsule C. The mechanical members 71 are in connection with the electrical management parts, schematically indicated with reference numeral 73, and with the hydraulic management parts, schematically indicated with reference numeral 75, of the machine. A suitable shape of the mechanical members 71 allows acting, for example, on switches, commutators, valves or other members relating to the electrical management 73 or to the hydraulic management 75 of the machine for setting the operation of the latter according to seat 8 mounted on drawer 7.

For example, in this way it is possible to suppose the use of capsules for espresso coffee with a type of seat 8 or capsules for long coffee or American coffee of different shapes and therefore requiring a different seat 8. Replacing (during the machine construction and assembly, or by the user) seat 8 with the operations described above it is possible to interact with the electrical 73 and/or hydraulic 75 management of the machine by automatically switching the operation of the latter according to the type of seat and capsule used. For example, it is possible to affect the machine management members by setting a different dispensing pressure according to the type of capsule used, or setting a dispensing amount or a dispensing temperature or a set of multiple parameters variable according to the capsule type.

Figure 15A:
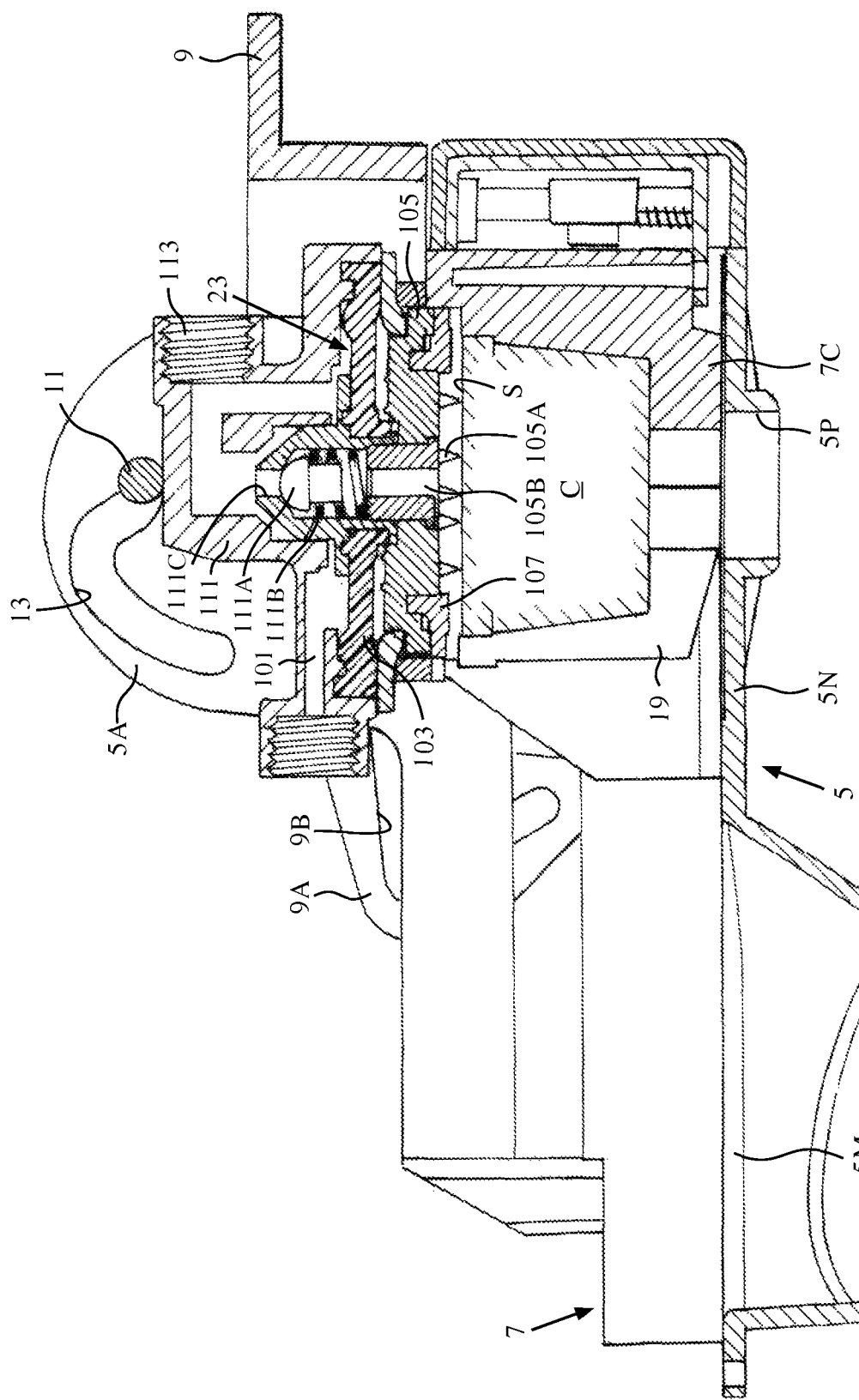
FIGS. 15A-15C show a longitudinal section view according to a vertical plane of a further embodiment of the infusion unit in different steps of the infusion cycle.
Figure 15B:
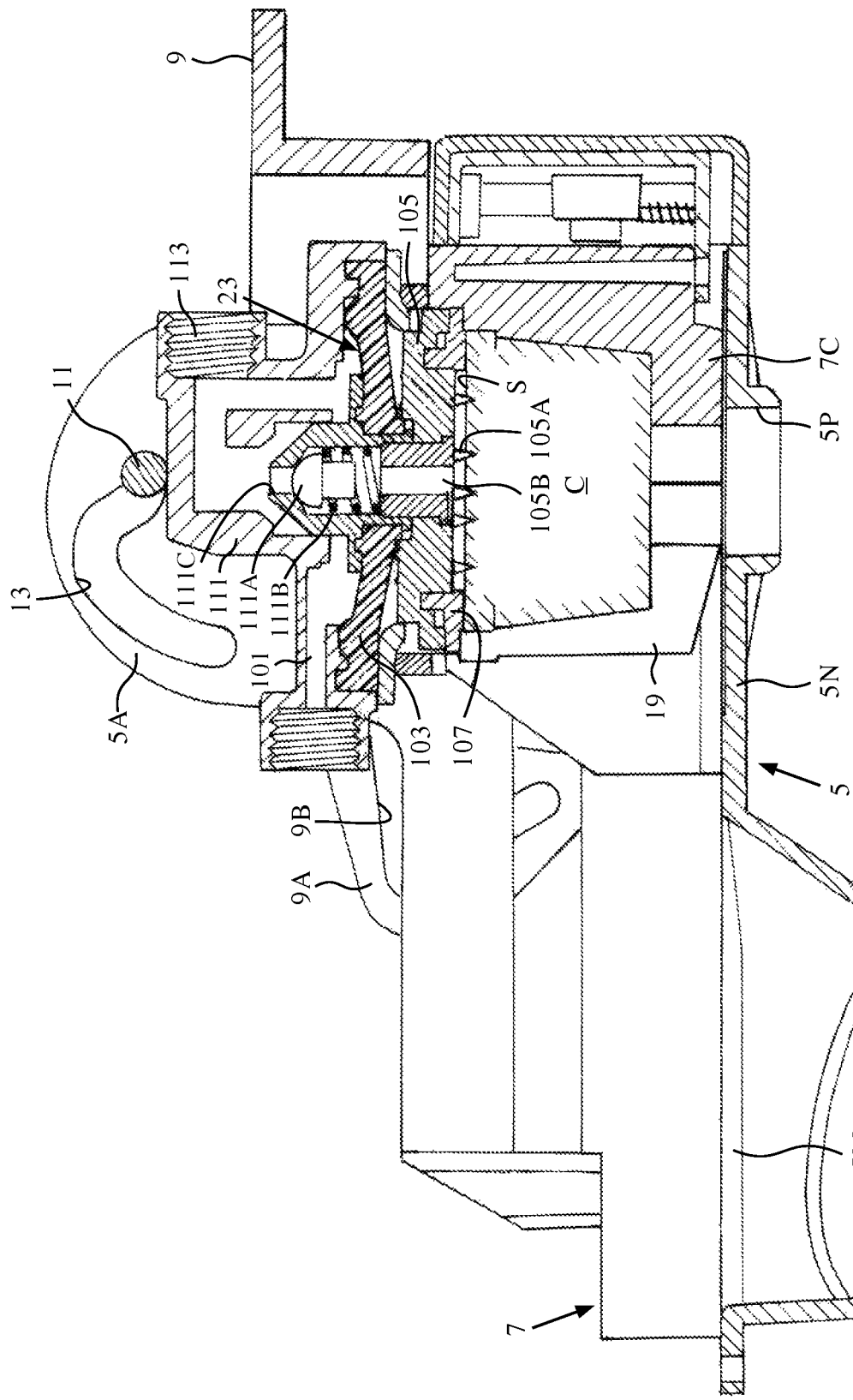
Figure 15C:
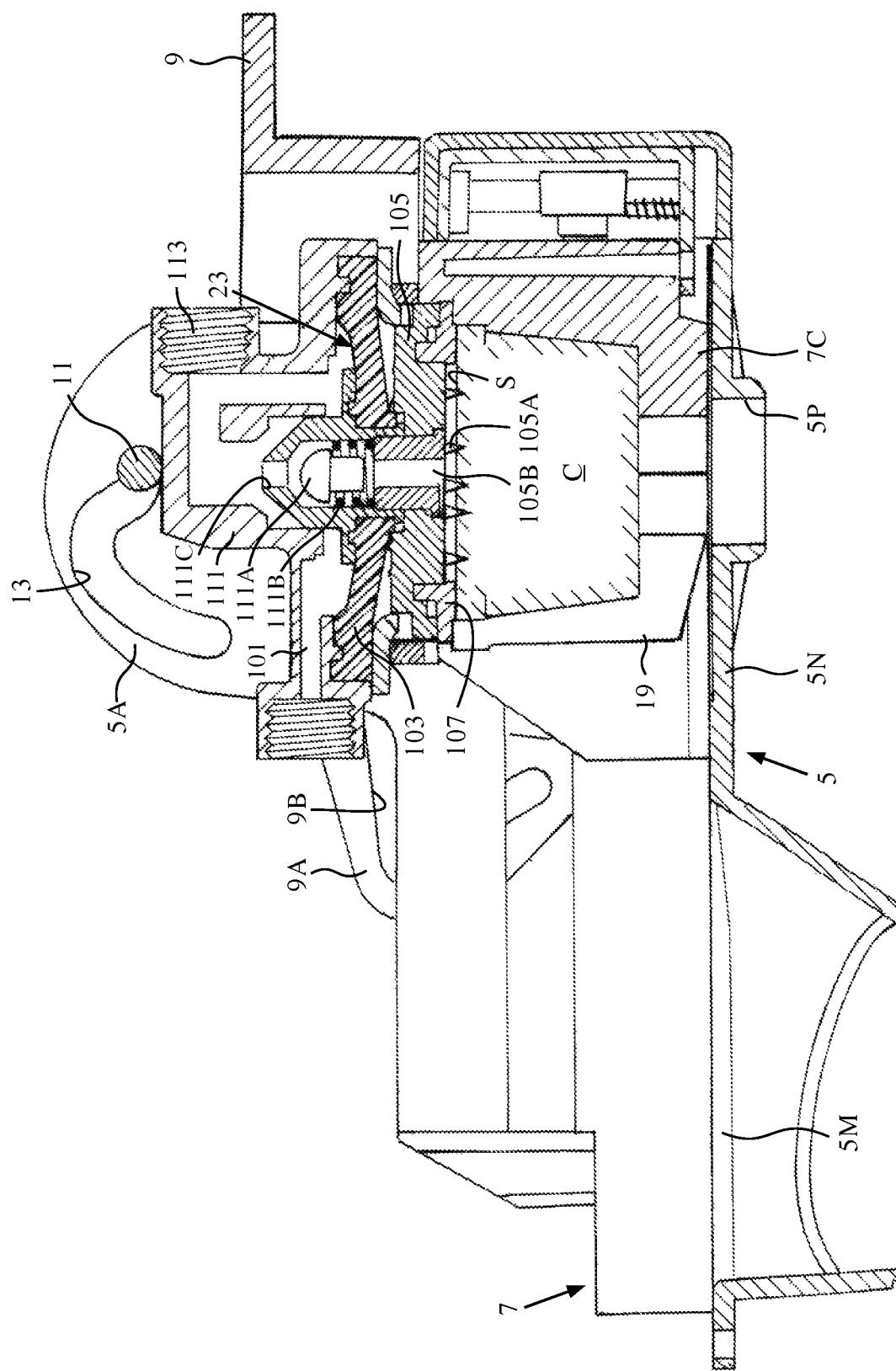

FIGS. 15A-15C show, in three steps of the infusion cycle, a modified embodiment of the infusion unit according to the invention. Equal numbers indicate equal parts to those described with reference to the embodiments shown in the previous figures.

The variations compared to the previous embodiments in particular relate to the hot water dispensing member 23. In this case, the dispensing member 23 receives hot water under pressure through a conduit 23A for feeding hot water under pressure. Conduit 23A is in fluid connection with a chamber 101 wherein a movable element is arranged, shaped as a flexible disc element 103 constrained to a piercing plate 105 fitted with piercing tips 105A. The piercing plate 105 is integral to an annular seal 107 and exhibits a through hole 105B that sets into connection the top face with the bottom face of the piercing plate 105.

The flexible disc element 105 carries, on the face opposite the bottom face whereon the piercing tips 105A are made, a valve 111 provided with a gate 111A stressed by a spring 111 B in a closed position against a gap 111 C that sets into connection chamber 101 with the through hole 105B.

The operation of the infusion unit in the embodiment of FIGS. 15A-15C is as follows. FIG. 15A shows the position wherein capsule C has been inserted into the infusion position, at the dispensing member 23 and thereunder. Feeding hot water into chamber 101, the flexible disc element 103 is deformed downwards (FIG. 15) moving seal 107 to press against the flange of capsule C. The piercing tips 101A of the piercing plate 101 penetrate into the sheet or film that closes capsule C at the top, incising or piercing it. Valve 111 is still closed since the force of spring 111B is still higher than the pressure exerted on gate 111A. Continuing to increase the pressure of hot water into chamber 101 by the effect of the feeding of the coffee machine pump, the opening of valve 111 is reached, as shown in FIG. 15C. The hot water under pressure thus starts to flow through hole 105B into capsule C extracting the flavours from the product contained into the capsule. FIGS. 15A-15C also show a conduit 113 for relieving the pressure at the cycle end.

It is understood that the drawing only shows an example provided by way of a practical arrangement of the invention, which can vary in forms and arrangements without however departing from the scope of the concept underlying the invention.

For example, according to an embodiment variation, the device may be made for seating single-serving pods instead of single-serving capsules. In this case, member 23 does not consist of a piercing member 23P with a permeable tip but a dispensing member if other type. In some embodiments, member 23 may consist of a movable element in a direction about orthogonal to the pod, with a filter wherethrough water under pressure passes, surrounded by a sealing ring that is pressed against the pod surface. In this way, a sealed volume is provided between the feeding conduit of water under pressure and the pod, such that the water coming from the conduit is distributed by the filter on a surface corresponding to the inner surface of the sealing ring and is forced to pass through the non-woven fabric, paper or other permeable material that forms the pod enclosure and then through the coffee powder or other food product contained therein. Also in this case, by the simple actuation of lever 9, the above linkage allows performing all the movements, including the approach of the dispensing member to the pod for moving the dispensing member in fluid connection with the pod.

The possible presence of reference numbers in the annexed claims has the purpose of facilitating reading thereof with reference to the description and to the drawings, and in no way limits the field of protection represented by the claims.

The invention claimed is:

1. An infusion unit for making a beverage with single-serving sachets, comprising:
   a support;
   a drawer including a removable seat for a single-serving sachet, the removable seat being removable form the drawer and the drawer being slideable relative to said support and movable between a charging position of the single-serving sachet and an infusion position;
   a dispensing member for dispensing water under pressure to said single-serving sachet;
   a lever for controlling movement of said drawer and a mechanical connection between said lever and said drawer and between said lever and said dispensing member, actuation of the lever causing the movement of the drawer from the charging position to the infusion position and approach of the dispensing member to the single-serving sachet; and
   a stopping element for locking the single-serving sachet into the infusion position, preventing movement of the single-serving sachet towards the charging position when said drawer is moved from the infusion position to the charging position;
   wherein said removable seat is partly delimited by a pair of arms oscillating relative to said drawer for allowing removal of empty single-serving sachets from said removable seat during the drawer movement from the infusion position to the charging position, and wherein said dispensing member comprises a sealing member movable towards the single-serving sachet, when said dispensing member is in the infusion position, under a thrust of water under pressure for adjusting to a front surface of the single-serving sachet and forming a seal on the front surface.

2. The infusion unit according to claim 1, wherein said removable seat is further partly delimited by a wall, and wherein said wall and said pair of arms are removably applied to said drawer.

3. The infusion unit according to claim 2, wherein said wall and said pair of arms together form a surface with a shape corresponding to a shape of an outer side surface of the single-serving sachets, and wherein the wall faces backward and the arms face forward relative to the drawer moving from the charging position to the infusion position.

4. The infusion unit according to claim 1, wherein movements of said dispensing member and of said drawer are coordinated with each other, and wherein the dispensing member moves toward the single-serving sachet when said single-serving sachet moves to the infusion position by movement said drawer.

5. The infusion unit according to claim 1, wherein said arms are oscillating about respective axes substantially orthogonal to the movement of said drawer.

6. The infusion unit according to claim 1, wherein said arms are substantially symmetrical relative to the movement direction of said drawer.

7. The infusion unit according to claim 1, further comprising means for controlling the movement of said arms towards a closed position.

8. The infusion unit according to claim 7, wherein said control means and said oscillating arms are pushed towards an open position by the empty single-serving sachet retained into infusion position, during the drawer movement from the infusion position to the charging position.

9. The infusion unit according to claim 1, wherein said stopping element comprises a sheet element integral to the support, wherein the sheet element allows passage of the single-serving sachet towards the infusion position and prevents the passage of the single serving sachet from the infusion position to the charging position.

10. The infusion unit according to claim 1, further comprising a lock for the drawer movement, said lock preventing a movement of the drawer during an infusion of the water through the single-serving sachet in the infusion position.

11. The infusion unit according to claim 10, wherein said lock of the drawer movement is controlled by said lever.

12. The infusion unit according to claim 11, wherein said lock of the drawer movement is integral to said dispensing member.

13. The infusion unit according to claim 1, further comprising a locking device of said oscillating arms for locking said oscillating arms.

14. The infusion unit according to claim 13, wherein said locking device of said oscillating arms is controlled by said lever, and wherein said locking device comprises a projection provided on each oscillating arm and is configured to abut against a plate of the support in the infusion position.

15. The infusion unit according to claim 14, wherein said locking device of said oscillating arms is integral to said dispensing member.

16. The infusion unit according to claim 1, wherein said lever comprises a first feeler cooperating with a first cam profile integral with said support, said first cam profile comprising:
 a first arched portion extending between a first end of the first cam profile corresponding to the charging position of the drawer, and an intermediate point of said cam profile, whereat the drawer is in the infusion position and the dispensing member is not in fluid connection with the single-serving sachet; and
 a second arched portion extending between said intermediate point and a second end of the first cam profile, said second end corresponding to a position wherein said dispensing member is in fluid connection with the single-serving sachet.

17. The infusion unit according to claim 16, wherein said first feeler comprises a first pin, and wherein said first cam profile further comprises two mirror channels made into two corresponding sides of said support.

18. The infusion unit according to claim 16, wherein said lever comprises a second feeler cooperating with a second cam profile integral with said support, said second cam profile having a substantially rectilinear shape, substantially orthogonal to the movement of said drawer and substantially parallel to a movement of the dispensing member.

19. The infusion unit according to claim 18, wherein said second feeler comprises a second pin, and wherein said second cam profile comprises two substantially mirror channels made into two corresponding sides of the support.

20. The infusion unit according to claim 19, wherein said second pin is constrained to a slide, and wherein said dispensing member is mounted on the slide.

21. The infusion unit according to claim 20, wherein said slide is guided by sliding pins into slots made in said support.

22. The infusion unit according to claim 1, wherein said lever comprises a shaped slot wherein a pin engages, for the mechanical connection between said lever and said drawer.

23. The infusion unit according to claim 1, wherein said dispensing member comprises a piercing member for piercing said single-serving sachets, the movement of approach of the dispensing member causing the piercing of the single-serving sachet by said piercing member.

24. The infusion unit according to claim 1, further comprising members suitable for interacting with said removable seat for the single-serving sachet and with machine management members for modifying operation of a machine including the infusion unit according to a configuration of said removable seat.

25. The infusion unit according to claim 1, wherein said dispensing member comprises a chamber in connection with a conduit for feeding hot water under pressure, wherein said chamber is partly delimited by a movable element moveable between a retracted position and an extended position, and wherein in the retracted position the movable element is retracted inside the chamber leaving a space between the movable element and the single-serving sachet and in the extended position the movable element is pressed against the single-serving sachet by feeding of the water under pressure in said chamber, said movable element having sealing members pressed against the front surface of said single-serving sachet to form a seal.

26. The infusion unit according to claim 25, wherein said movable element carries a valve that is opened by the pressure of the hot water feeding into said chamber when said pressure has exceeded a value sufficient for obtaining the seal between the front surface of said single-serving sachet and said sealing members.

27. The infusion unit according to claim 1, wherein the movement of said drawer relative to said support is guided by two pairs of pins which engage and slide in a slot in each side of said support during a movement of said lever.

28. An infusion unit for making a beverage with single-serving sachets, comprising:
 a support;
 a drawer including a removable seat for a single-serving sachet, the removable seat being removable form the drawer and the drawer being slideable relative to said support and movable between a charging position of the single-serving sachet and an infusion position;
 a dispensing member for dispensing water under pressure to said single-serving sachet;
 a lever for controlling the movement of said drawer and a mechanical connection between said lever and said drawer and between said lever and said dispensing member, actuation of the lever causing movement of the drawer from the charging position to the infusion position and approach of the dispensing member to the single-serving sachet;

a stopping element for locking the single-serving sachet into the infusion position, preventing movement of the single-serving sachet towards the charging position when said drawer is moved from the infusion position to the charging position; and interaction members configured to interact with a type of the removable seat and distinguish between a first type and a second type of the removable seat, wherein said removable seat is partly delimited by a pair of arms oscillating relative to said drawer for allowing removal of empty single-serving sachets from removable said seat during the drawer movement from the infusion position to the charging position, and wherein said dispensing member is associated to a sealing member movable towards the single-serving sachet, when it is in the infusion position, for pressing against a top external edge of the single-serving sachet.

29. The infusion unit according to claim 28, wherein the interaction members are operatively coupled with mechanical members, electrical management parts and hydraulic management parts of the infusion unit for setting an operation of the infusion unit and infusion parameters according to the type of the removable seat interacting with the interaction members.

30. A coffee machine for making a beverage with single-serving sachets comprising an infusion unit, wherein the infusion unit comprises:

a support;

a drawer including a removable seat for a single-serving sachet, the removable seat being removable form the drawer and the drawer being slideable relative to said support and movable between a charging position of the single-serving sachet and an infusion position;

a dispensing member for dispensing water under pressure to said single-serving sachet;

a lever for controlling movement of said drawer and a mechanical connection between said lever and said drawer and between said lever and said dispensing member, actuation of the lever causing the movement of the drawer from the charging position to the infusion position and approach of the dispensing member to the single-serving sachet; and a stopping element for locking the single-serving sachet into the infusion position, preventing movement of the single-serving sachet towards the charging position when said drawer is moved from the infusion position to the charging position;

wherein said removable seat is partly delimited by a pair of arms oscillating relative to said drawer for allowing removal of empty single-serving sachets from said removable seat during the drawer movement from the infusion position to the charging position, and wherein said dispensing member comprises a sealing member movable towards the single-serving sachet, when said dispensing member is in the infusion position, under a thrust of water under pressure for adjusting to a front surface of the single-serving sachet and forming a seal on the front surface.

31. The coffee machine of claim 30, further comprising a interaction members configured to detect a type of the removable seat exhibited on said drawer, and wherein said interaction members are further configured to interact with machine management members to automatically select operating conditions of the coffee machine based on the type of the removable seat detected by said interaction members.

* * * * *